United States Patent
Tang et al.

(10) Patent No.: US 12,206,327 B2
(45) Date of Patent: Jan. 21, 2025

(54) DC-DC CONVERTER WITH MODE-SWITCHING COMPENSATION LOOP

(71) Applicant: TEXAS INSTRUMENTS INCORPORATED, Dallas, TX (US)

(72) Inventors: Hua Tang, Shenzhen (CN); Teng Feng, Shenzhen (CN); Ian Lloyd Bower, Bedford, TX (US); Yunsheng Qu, Shenzhen (CN); Zhaofu Zhou, Shenzhen (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 445 days.

(21) Appl. No.: 17/681,975

(22) Filed: Feb. 28, 2022

(65) Prior Publication Data

US 2023/0275509 A1    Aug. 31, 2023

(51) Int. Cl.
*H02M 3/157* (2006.01)
*H02M 1/00* (2006.01)
*H02M 3/156* (2006.01)

(52) U.S. Cl.
CPC ......... *H02M 3/157* (2013.01); *H02M 1/0025* (2021.05); *H02M 1/0035* (2021.05); *H02M 3/156* (2013.01); *H02M 3/1566* (2021.05)

(58) Field of Classification Search
CPC .... H02M 1/0035; H02M 1/0025; H02M 3/01; H02M 3/1566; Y02B 70/10
See application file for complete search history.

(56) References Cited

U.S. PATENT DOCUMENTS

| | | | | |
|---|---|---|---|---|
| 11,616,436 B2* | 3/2023 | Mei | ...... | H02M 1/0025 323/282 |
| 2007/0108954 A1* | 5/2007 | Qiu | ...... | H02M 3/156 323/284 |
| 2008/0218145 A1* | 9/2008 | Xu | ...... | H02M 3/156 323/288 |
| 2008/0252277 A1* | 10/2008 | Sase | ...... | H02M 3/157 323/283 |
| 2008/0298090 A1* | 12/2008 | Li | ...... | H02M 3/157 363/21.01 |
| 2009/0316441 A1* | 12/2009 | Hu | ...... | H02M 3/33592 363/21.06 |

(Continued)

OTHER PUBLICATIONS

Texas Instruments. "UCD3138 Highly Integrated Digital Controller for Isolated Power." SLUSAP2J—Mar. 2021—Revised Nov. 2021. 104 pages.

*Primary Examiner* — Yusef A Ahmed
(74) *Attorney, Agent, or Firm* — Ray A. King; Frank D. Cimino

(57) ABSTRACT

A DC-DC converter includes a ramp generator, a threshold voltage circuit, and a control circuit. The ramp generator is configured to generate a voltage ramp. The threshold voltage circuit is configured to generate a threshold voltage. The control circuit is coupled to the ramp generator and the threshold voltage circuit. The control circuit includes a digital pulse width modulator (DPWM) circuit and a loop compensation circuit coupled to the DPWM circuit. The DPWM circuit is configured to generate a power stage switch control signal responsive to a loop compensation value. The loop compensation circuit is coupled to the DPWM circuit. The loop compensation circuit is configured to calculate the loop compensation value responsive to the voltage ramp exceeding the threshold voltage.

17 Claims, 6 Drawing Sheets

(56) References Cited

U.S. PATENT DOCUMENTS

| | | | | |
|---|---|---|---|---|
| 2010/0079323 A1* | 4/2010 | Miao | H02M 3/157 | 341/142 |
| 2010/0301823 A1* | 12/2010 | Ishigaki | H02M 3/157 | 323/283 |
| 2011/0316508 A1* | 12/2011 | Cheng | H02M 1/14 | 327/134 |
| 2012/0105030 A1* | 5/2012 | Chen | H02M 3/156 | 323/271 |
| 2012/0153917 A1* | 6/2012 | Adell | H02M 3/1588 | 323/283 |
| 2013/0003421 A1* | 1/2013 | Fang | H02M 3/33523 | 363/21.01 |
| 2013/0229829 A1* | 9/2013 | Zhang | H02M 3/01 | 363/16 |
| 2013/0249517 A1* | 9/2013 | Shiraishi | H02M 3/157 | 323/283 |
| 2014/0266121 A1* | 9/2014 | Wee | H02M 3/1588 | 323/283 |
| 2014/0320100 A1* | 10/2014 | Congiu | H02M 3/157 | 323/282 |
| 2015/0200592 A1* | 7/2015 | Chang | H02M 3/156 | 323/288 |
| 2015/0311798 A1* | 10/2015 | Yuan | H02M 3/156 | 323/288 |
| 2017/0237356 A1* | 8/2017 | Chen | H02M 3/33553 | 363/21.02 |
| 2018/0131273 A1* | 5/2018 | de Cremoux | H02M 1/4208 | |
| 2020/0036287 A1* | 1/2020 | Peretz | H03F 3/2171 | |
| 2020/0169176 A1* | 5/2020 | Murata | H02M 3/01 | |
| 2020/0228012 A1* | 7/2020 | Lynch | H02M 3/158 | |
| 2021/0159787 A1* | 5/2021 | Gibson | H02M 3/158 | |
| 2022/0294343 A1* | 9/2022 | Peretz | H02M 1/08 | |
| 2023/0261583 A1* | 8/2023 | Zhang | H02M 1/0025 | 323/282 |

\* cited by examiner

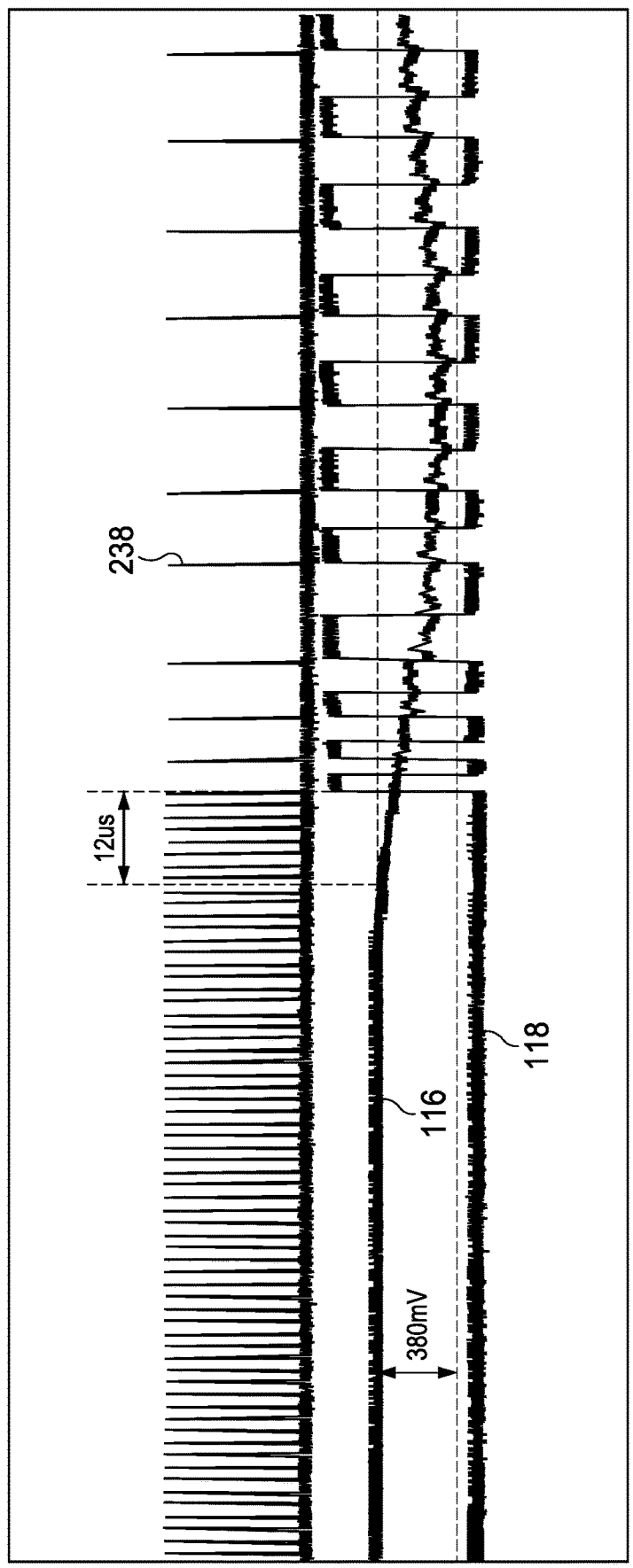

DC-DC CONVERTER WITH MODE-SWITCHING COMPENSATION LOOP

BACKGROUND

A DC-DC converter is an electronic circuit that converts an input direct current (DC) voltage into one or more DC output voltages that are higher or lower in magnitude than the input DC supply voltage. A DC-DC converter that generates an output voltage lower than the input voltage, is termed a buck or step-down converter. A DC-DC converter that generates an output voltage higher than the input voltage is termed a boost or step-up converter. DC-DC converters are widely used to power electronic devices, particularly battery powered devices, such as portable cellular phones, laptop computers, and other electronic systems in which efficient use of power is desirable.

SUMMARY

In one example, a DC-DC converter includes a ramp generator, a threshold voltage circuit, and a control circuit. The ramp generator is configured to generate a voltage ramp. The threshold voltage circuit is configured to generate a threshold voltage. The control circuit is coupled to the ramp generator and the threshold voltage circuit. The control circuit includes a digital pulse width modulator (DPWM) circuit and a loop compensation circuit coupled to the DPWM circuit. The DPWM circuit is configured to generate a power stage switch control signal responsive to a loop compensation value. The loop compensation circuit is coupled to the DPWM circuit. The loop compensation circuit is configured to calculate the loop compensation value responsive to the voltage ramp exceeding the threshold voltage.

In another example, a process for controlling loop compensation in a DC-DC converter includes generating a voltage ramp, and generating a threshold voltage. The voltage ramp is compared to the threshold voltage. A loop compensation circuit calculates a loop compensation value responsive to the voltage ramp exceeding the threshold voltage. A digital pulse width modulator (DPWM) circuit generates a switch control signal based on the loop compensation value. The switch control signal is applied to control a power stage.

In a further example, a DC-DC converter includes a ramp generator, a threshold voltage circuit, and a control circuit. The ramp generator includes an input and an output. The threshold voltage circuit includes an output. The control circuit includes an analog comparator, a digital pulse width modulator (DPWM) circuit, and a loop compensation circuit. The analog comparator has a first input, a second input, and an output. The first input is coupled to the output of the ramp generator. The second input is coupled to the output of the threshold voltage circuit. The DPWM circuit has a ramp control output and a compensation trigger circuit. The ramp control output is coupled to the input of the ramp generator. The compensation trigger circuit is coupled to the output of the analog comparator, and includes a compensation trigger output. The loop compensation circuit includes an input coupled to the compensation trigger output of the compensation trigger circuit, and an output coupled to the loop compensation input of the DPWM circuit.

BRIEF DESCRIPTION OF THE DRAWINGS

FIG. 6A illustrates the response of the DC-DC converter of FIG. 1 with variable compensation loop calculation rate based on burst state.

DETAILED DESCRIPTION

Figure 1:
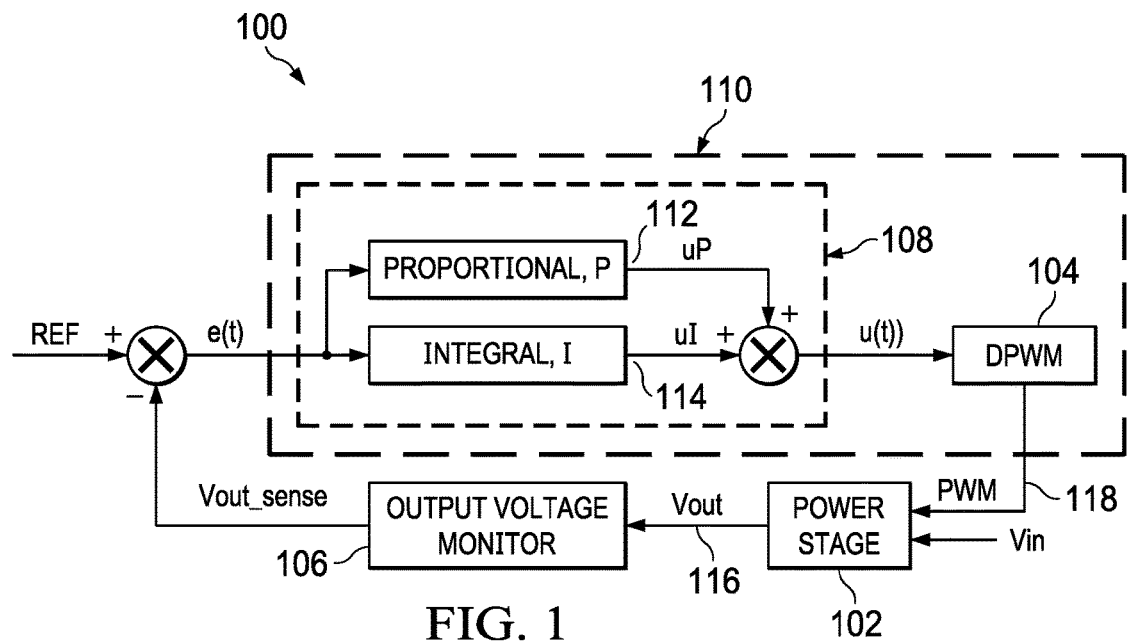
FIG. 1 is a block diagram of an example DC-DC converter as described herein.

When the load powered by a DC-DC converter increases from light to heavy, the DC-DC converter's output current increases at a high slew rate, which may cause a drop in the DC-DC converter's output voltage. In some cases, the drop in output voltage may exceed a predetermined maximum allowable voltage drop, and degrade the performance of the load circuit.

A variety of solutions have been implemented to reduce the drop in output voltage with increasing load. For example, the bandwidth of the DC-DC converter's control loop may be increased to improve transient response, but this solution is often limited by converter topology and hardware. Output filter capacitance may also be increased to reduce output voltage drop. However, generally a bulk filter capacitor must have very lower equivalent series resistance (ESR). To provide an appropriately low ESR, multiple bulk capacitors may need to be connected in parallel, which increases circuit area (e.g., printed circuit board area) and circuit cost. Output filter inductance may also be decreased to reduce output voltage drop, but decreasing inductance lowers the efficiency of the DC-DC converter and requires an increase in converter switching frequency.

In digital DC-DC converters, nonlinear control may be used to reduce the output voltage undershoot when the load increases by applying different loop calculation parameters according to different error values of the output voltage. However, such DC-DC converter implementations are subject to periods of unstable operation when in burst mode, requiring intervention by a controller that manages DC-DC converter operation.

Some DC-DC converters implement burst mode to improve efficiency with light loads. Burst mode operation is implemented using a burst-on state in which the converter's switching transistors are turned on and off to source current to the output of the output DC-DC converter, and a burst-off state in which the switching transistors are turned off. The DC-DC converter operates in the burst-off state when lightly loaded, and operates in the burst-on state when loading increases. To reduce the drop in output voltage when transitioning from burst-off state with a light load (where there is no pulse width modulator (PWM) operation or energy transfer from the DC-DC converter input to output) to burst-on state (where there is PWM operation and energy transfer from the DC-DC converter input to output), fast response of the DC-DC converter's compensation loop is needed during burst-off state operation. However, during burst-on state operation, the compensation loop response speed should be limited to provide sufficient phase and gain margin for stable operation of the DC-DC converter. Thus, the response speed of the compensation loop should vary in order to provide both stability in burst-on state and small output voltage drop when transitioning from burst-off state to burst-on state. The response speed of the compensation loop may be varied by changing the compensation loop calculation rate with DC-DC converter burst state.

The mode-switching (between compensation loop calculation rates for different burst states) should be executed quickly, and controller involvement should be reduced or eliminated (even in a microcontroller controlled digital DC-DC converter) because the delay from execution of controller instructions to a change modes is too long to realize the advantage of the mode-switching function to reduce the output voltage drop. The delay may result in a period of unstable operation of the DC-DC converter, which is not desirable.

The DC-DC converters described herein provide fast switching of the compensation loop calculation rate. Mode switching delays are short, and no controller intervention is required.

FIG. 1 is a block diagram of an example DC-DC converter 100. The DC-DC converter 100 includes a power stage 102 that generates an output voltage Vout 116 from an input voltage Vin based on pulse width modulation (PWM) signals 118, for example, digital PWM (DPWM) signals generated by a PWM signal generator, such as a DPWM circuit 104. The DPWM signals 118 include gate drive signals used to activate or deactivate switches, e.g., high-side and low-side switches, in the power stage 102. The DC-DC converter 100 further includes an output voltage monitor circuit 106 configured to sense the output voltage Vout 116 and generate a sensed output voltage Vout_sense based on, for example, proportional to, the output voltage Vout 116. An error e(t) between the sensed output voltage Vout_sense and a reference voltage REF is provided to a loop compensation circuit 108. The loop compensation circuit 108 may include a proportional integral derivative (PID) controller, or a proportional integral controller (PI) controller. The loop compensation circuit 108 is configured to generate a compensated signal u(t) based on the error e(t). The compensated signal u(t) is provided to the DPWM circuit 104. The DPWM circuit 104 generates the PWM signals 118 provided to the power stage 102 based on the compensated signal u(t). The loop compensation circuit 108 and the DPWM circuit 104 can be a part of a control circuit 110 (e.g., a digital controller) of the DC-DC converter 100.

In some implementations of the DC-DC converter 100, the loop compensation circuit 108 includes a PI controller. The PI controller includes a proportional part 112 and an integral part 114. An analog PI control algorithm implemented by the PI controller may be expressed as:

$$u(t) = K_p \times e(t) + K_i \int_0^t e(t) dt \qquad (1)$$

where:
K$_p$ is a proportional coefficient;
K$_i$=K$_p$/T$_i$;
T$_i$ is an integral time constant;
e(t) is the input error signal; and
u(t) is the output of the PI controller.

A digital PI control algorithm is expressed in equation (2). Equation (2) is derived from the analog PI control algorithm of equation (1) after discretization. In equation (2), a series of calculating time points kT are used to represent the continuous time t, and the rectangular numerical integration approximation is used to replace the integral.

$$u(k) = K_p \times e(k) + K_i T \sum_{j=0}^{k} e(j) \qquad (2)$$

where:
K$_p$ is a proportional coefficient;
K$_i$=K$_p$/T$_i$;
T$_i$ is integral time constant;
T is the calculation period;
k is calculating sequence, k=b 1, 2, . . . ;
e(k) is input error signal at the time k; and
u(k) is the output of loop compensation at the time k.

Equations (1) and (2) indicate that by decreasing the calculating period T, the output of the digital PI controller can better reflect the output of an analog PI controller and decrease the time needed to respond to input error. Therefore, the DC-DC converter 100 changes the compensation loop calculation rate with switching of the burst state of the DC-DC converter 100 (e.g., switching from burst-on state to burst-off state, and vice-versa) to change the compensation loop response speed.

The DC-DC converter 100 includes fast burst-state based switching of the compensation loop calculation rate. When the DC-DC converter 100 is operating in burst-off state to power a light load, the loop compensation circuit 108 computes loop compensation values at a faster rate (e.g., about 1 μs computation period). When the DC-DC converter 100 is operating in burst-on state to power a heavier load, the loop compensation circuit 108 computes loop compensation values at a slower rate. The period of the slower rate may be equal to the switching period of the power stage 102, which may be substantially greater than 1 μs. For example, the switching period of the power stage 102 may be about 10 μs when the DC-DC converter 100 is operating in burst-on state. In the DC-DC converter 100, changing the rate of loop compensation value computation is implemented without processor intervention.

Figure 2:
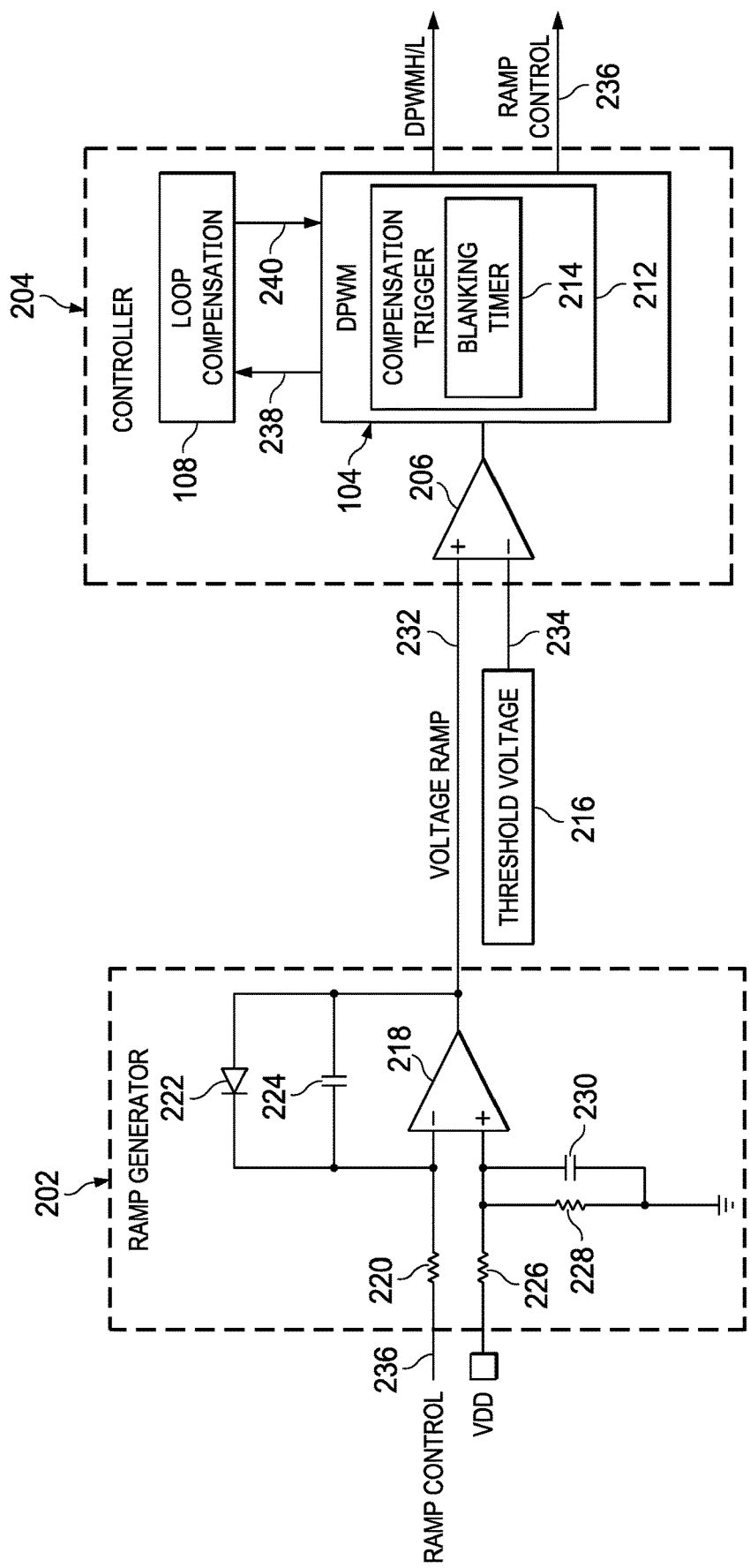
FIG. 2 is a block diagram for an example portion of the control circuit of FIG. 1 configured to vary compensation loop calculation rate based on burst state.

FIG. 2 is a block diagram for a portion of the control circuit 110 configured to vary compensation loop calculation rate based on burst state. The portion of the control circuit 110 shown in FIG. 2 includes a ramp generator 202 and a controller 204. The controller 204 includes an analog comparator 206, the loop compensation circuit 108, the DPWM circuit 104, and a threshold voltage source 216. The threshold voltage 234 generated by the threshold voltage source 216 is lower than the highest output voltage of the ramp generator 202.

The analog comparator 206 compares the voltage ramp 232 generated by the ramp generator 202 to the threshold voltage 234 generated by the threshold voltage source 216. A first input of the analog comparator 206 is coupled to an output of the ramp generator 202, and a second input of the analog comparator 206 is coupled to an output of the threshold voltage source 216. An output of the analog comparator 206 is coupled to the DPWM circuit 104.

The DPWM circuit 104 includes a compensation trigger circuit 212. The compensation trigger circuit 212 generates a compensation trigger signal 238 that initiates computation of a loop compensation value 240 by the loop compensation circuit 108. The loop compensation circuit 108 provides the loop compensation value 240 to the DPWM circuit 104 for use in generating the PWM signals (DPWMH/L) that control switching in the power stage 102. The loop compensation values may be provided as an analog voltage in some implementations of the loop compensation circuit 108. The compensation trigger circuit 212 activates the compensation trigger signal 238 based on the output of the analog comparator 206 indicating that the voltage of the voltage ramp 232 exceeds the threshold voltage 234. The voltage ramp 232 rises to and remains at a voltage greater than the threshold voltage 234 when the DC-DC converter 100 is operating in burst-off state. Selection of burst-on state or burst-off state may be based on the loop compensation values provided by the loop compensation circuit 108. For example, if the loop compensation values exceed a burst-on threshold, the DC-DC converter 100 may transition from burst-off state to burst-on state. If the loop compensation values are less than a burst-off threshold, then the DC-DC converter 100 may transition from burst-on state to burst-off state.

The compensation trigger circuit 212 includes a blanking timer 214 that sets the period of the compensation trigger signal 238 generated by the compensation trigger circuit 212 when the DC-DC converter 100 is operating in burst-off state. The blanking timer 214 may generate a blanking signal that disables activation of the compensation trigger signal for a predetermined time after the previous activation of the compensation trigger signal 238. The blanking signal may have a period of about 1 µs in some implementations of the blanking timer 214. Thus, the blanking timer 214 sets the rate (frequency) of the compensation trigger signal when the DC-DC converter 100 is operating in burst-off state.

The DPWM circuit 104 generates a ramp control signal 236 that controls generation of the voltage ramp 232 by the ramp generator 202. A ramp control output of the DPWM circuit 104 is coupled to a control input of the ramp generator 202 for controlling generation of the voltage ramp 232. The ramp generator 202 includes an amplifier 218, a resistor 220, a diode 222, a capacitor 224, a resistor 226, a resistor 228, and a capacitor 230. The ramp control signal 236 generated by the DPWM circuit 104 is provided to the inverting input of the amplifier 218 via the resistor 220. The diode 222 and the capacitor 224 are coupled in parallel between the output of the amplifier 218 and the inverting input of the amplifier 218. The resistor 226 and the resistor 228 are connected as a voltage divider between a voltage source (such as a power supply terminal) and the non-inverting input of the amplifier 218. The capacitor 230 is coupled between the non-inverting input of the amplifier 218 and ground.

When the DC-DC converter 100 is operating in burst-off state, the DPWM circuit 104 holds the ramp control signal 236 low, and the output of the amplifier 218 rises to a maximum voltage that is greater than the threshold voltage 234 generated by the threshold voltage source 216. Thus, the ramp control signal 236 holds the output of the ramp generator 202 at a voltage greater than the threshold voltage 234 while the DC-DC converter 100 is operating in burst-off state. When the DC-DC converter 100 is operating in burst-on state, the ramp control signal 236 has a 50% duty cycle, the voltage ramp 232 generated by the ramp generator 202 is generally below the threshold voltage 234 generated by the threshold voltage source 216, and the compensation trigger circuit 212 triggers computation of the loop compensation value when the voltage ramp 232 is equal to or greater than the threshold voltage 234. When operating in burst-on state, the frequency of the voltage ramp 232 is equal to the switching frequency of the power stage 102, resulting in a rate of computation of the loop compensation value that is substantially lower than when operating in burst-off state (e.g., 100 kilohertz versus 1 megahertz).

Figure 3:
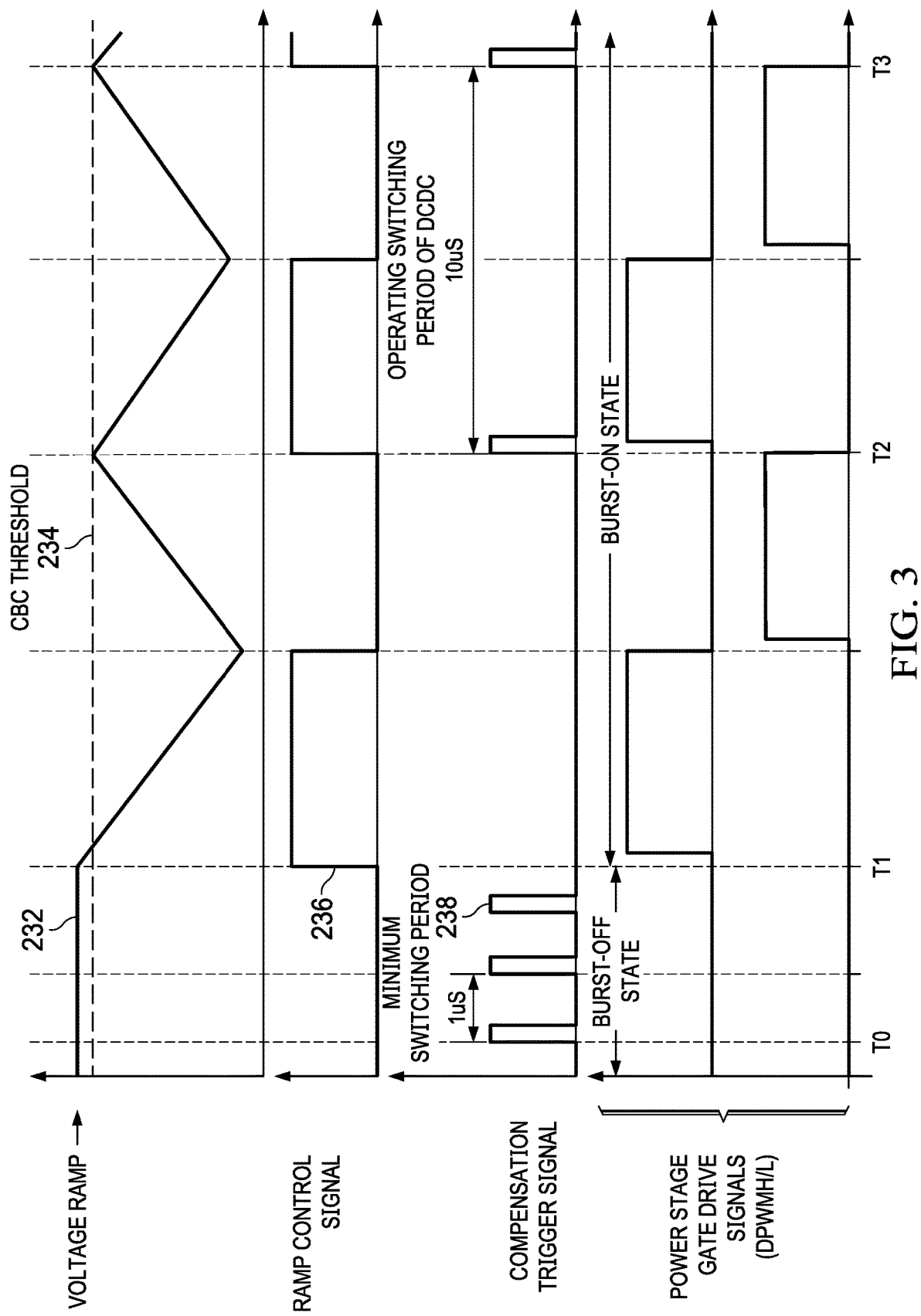
FIG. 3 illustrates example signals generated in the control circuit of FIG. 1 in burst-off and burst-on states.

FIG. 3 illustrates signals generated in the control circuit 110 in burst-off state and burst-on state. From time T0 to time T1, the DC-DC converter 100 is operating in burst-off state. While operating in burst-off state, the power stage gate drive signals (DPWMH/L) are inactive, the ramp control signal 236 is low, the voltage ramp 232 is greater than the threshold 234, and the compensation trigger signal 238 is provided at a maximum frequency determined by the blanking timer 214 (e.g., a 1 µs period). For example, the output of the analog comparator 206 may be gated by the output of the blanking timer 214 to generate the compensation trigger signal 238. The loop compensation circuit 108 computes a loop compensation value 230 with each activation of the compensation trigger signal 238.

From time T1 to time T3, the DC-DC converter 100 is operating in burst-on state. While operating in burst-on state, DPWMH and DPWML are alternately turned on and turned off to control the power stage 102. The ramp control signal 236 has a 50% duty cycle to control the rise and fall of the voltage ramp 232. The voltage of the voltage ramp 232 goes below the threshold voltage 234 at time T1, the period of the voltage ramp 232 is equal to the switching period of the DC-DC converter 100, which is much larger than the period of the compensation trigger signal 238 when the DC-DC converter 100 is operating in burst-off state (e.g., 10 µs versus 1 µs). When the voltage of the voltage ramp 232 is equal to or greater than the threshold voltage 234, the compensation trigger signal 238 is activated to trigger computation of a loop compensation value 240, and a new DPWM cycle is initiated (e.g., the ramp control signal 236 goes high).

Figure 4:
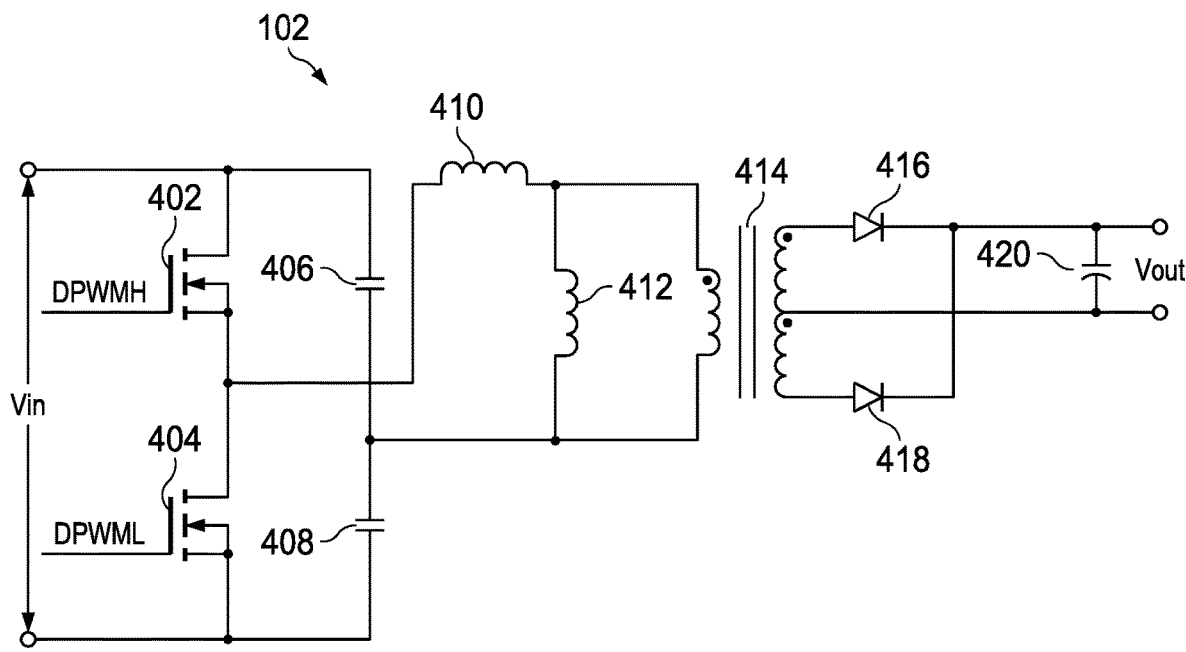
FIG. 4 is a schematic diagram for an example power stage of the DC-DC converter of FIG. 1.

FIG. 4 is a schematic diagram for an example power stage 102 suitable for use in the DC-DC converter 100. The DC-DC converter 100 may be an LLC resonant converter. The power stage 102 includes a high side transistor 402 and a low side transistor 404 configured to be reciprocally switched on and off by the DPWM signals DPWMH and DPWML during operation. The high side transistor 402 and the low side transistor 404 are coupled to a resonant circuit that includes the capacitors 406 and 408, the inductor 410, and the inductor 412. An output transformer 414 couples the resonant circuit to the rectifiers 416 and 418. Rectified output voltage is filtered by the capacitor 420.

Figure 5:
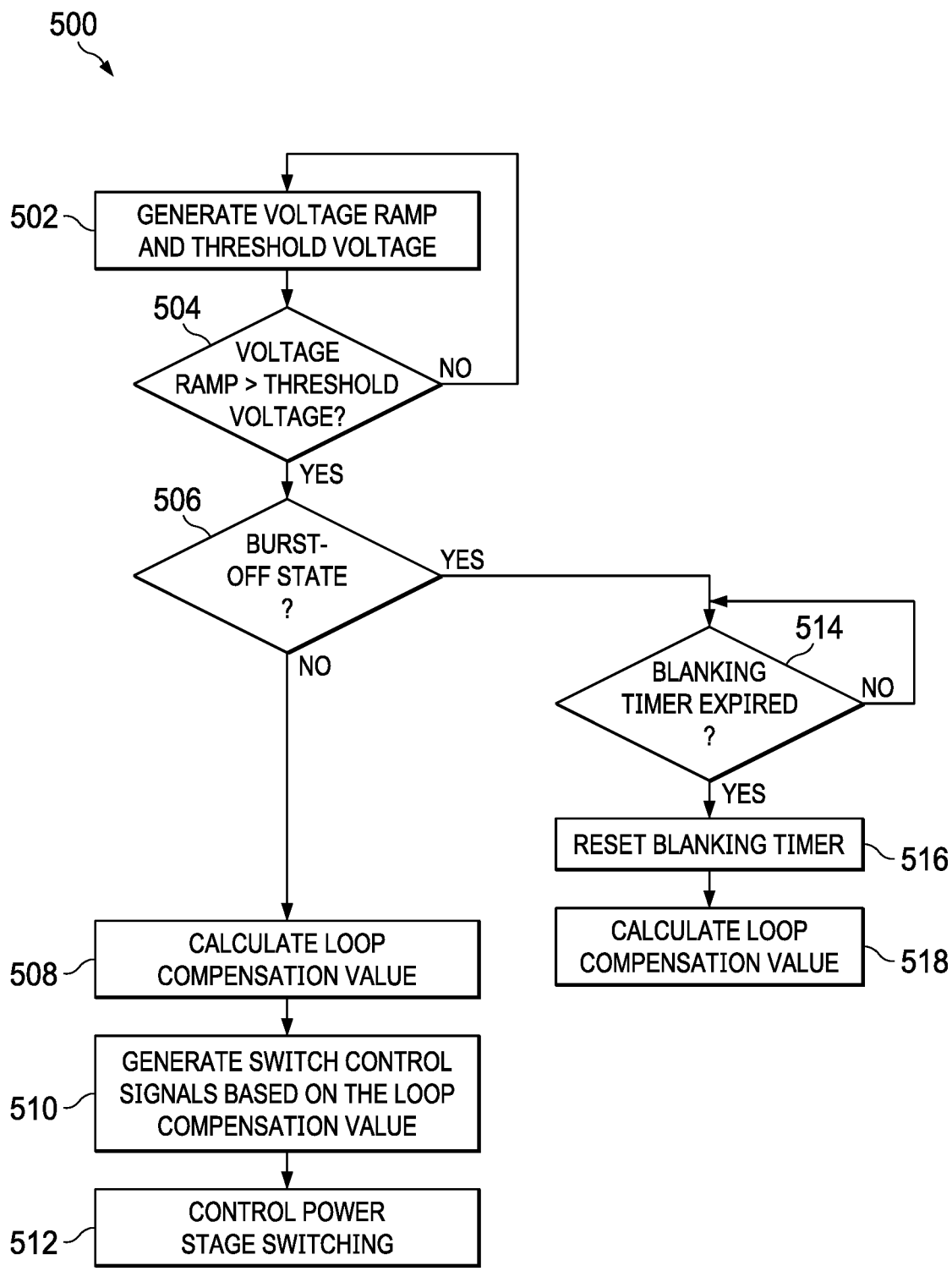
FIG. 5 is a flow diagram for an example method for varying compensation loop calculation rate based on operating mode.

FIG. 5 is a flow diagram for a method 500 for varying compensation loop calculation rate based on burst state. Though depicted sequentially as a matter of convenience, at least some of the actions shown can be performed in a different order and/or performed in parallel. Additionally, some implementations may perform only some of the actions shown. The operations of the method 500 may be repeatedly executed.

In block 502, the DC-DC converter 100 is operating. The DPWM circuit 104 is generating the ramp control signal 236, the ramp generator 202 is generating the voltage ramp 232, and the threshold voltage source 216 is generating the threshold voltage 234. If the DC-DC converter 100 is operating in burst-off state, then the ramp control signal 236 is held low, causing the ramp generator 202 to hold the voltage ramp 232 at a maximum output voltage of the ramp generator 202. If the DC-DC converter 100 is operating in burst-on state, then the ramp control signal 236 has a 50% duty cycle and a period equal to the switching period of the power stage 102. The voltage ramp 232 oscillates at the frequency of the ramp control signal 236.

In block 504, the analog comparator 206 compares the voltage ramp 232 to the threshold voltage 234. If the voltage of the voltage ramp 232 is greater than the threshold voltage 234, then the controller 204 determines whether the DC-DC converter 100 is operating in burst-off state in block 506.

If the controller 204 determines, in block 506, that the DC-DC converter 100 is operating in burst-off state, then, in block 514, the compensation trigger circuit 212 determines whether the blanking timer 214 has expired (reached a predetermined value corresponding to desired blanking time). If the blanking timer 214 has expired, then, in block 516, the compensation trigger circuit 212 resets the blanking timer 214, and the compensation trigger circuit 212 activates the compensation trigger signal 238 to cause the loop compensation circuit 108 to compute a loop compensation value 240 in block 518.

If the DC-DC converter 100 is operating in burst-on state in block 506, the compensation trigger circuit 212 activates the compensation trigger signal 238 to cause the loop compensation circuit 108 to compute a loop compensation value 240 in block 508.

In block 510, the loop compensation circuit 108 provides the loop compensation value 240 to the DPWM circuit 104 for use in generating the ramp control signal 236 and the DPWM signals (DPWMH/L) used to control the power stage 102.

In block 512, the DPWM circuit 104 provides the signals DPWMH and DPWML to the power stage 102, and provides the ramp control signal 236 to the ramp generator 202.

Figure 6B:
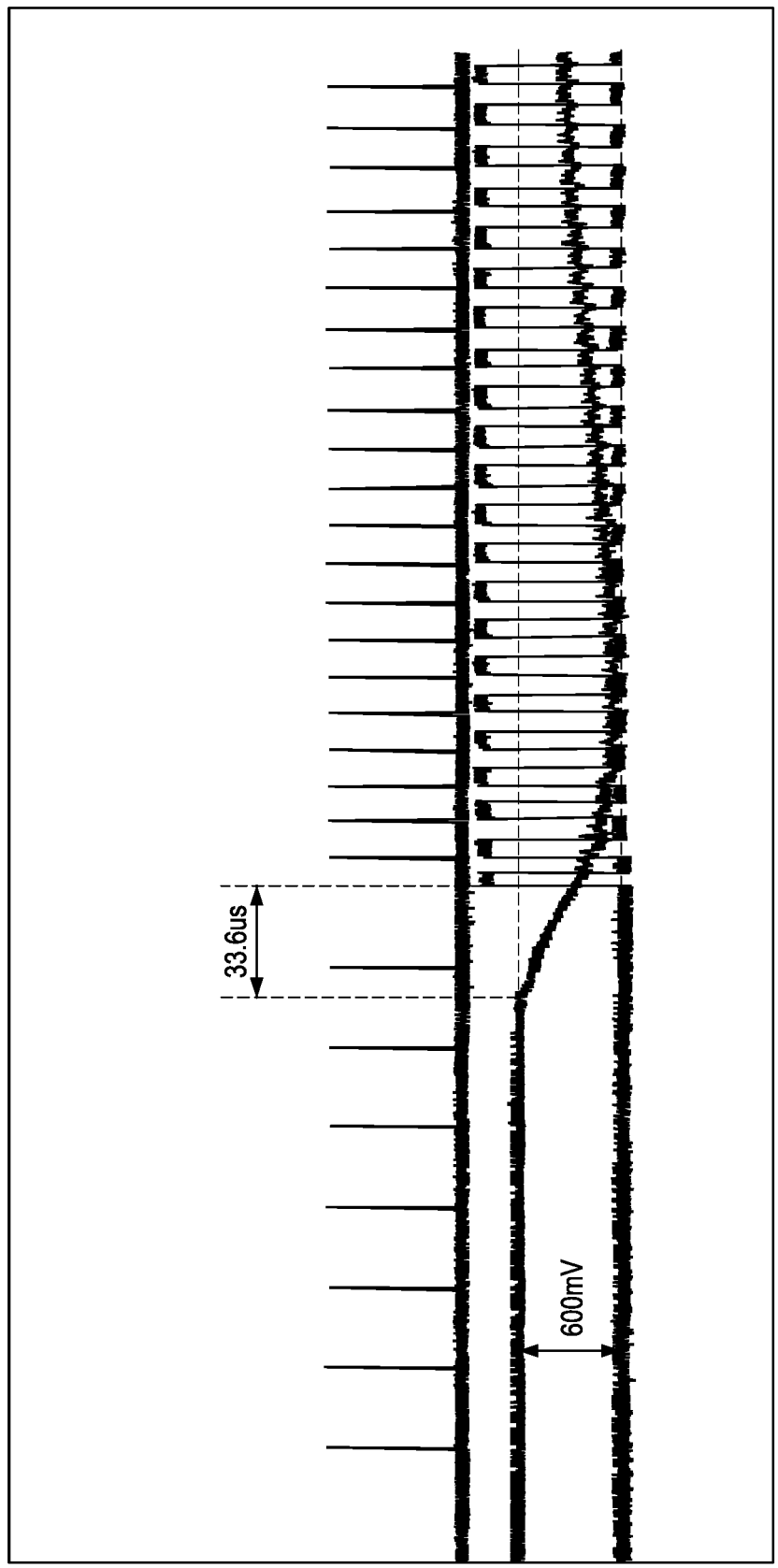
FIG. 6B illustrates the response of a DC-DC converter that lacks the variable compensation loop calculation rate described herein.

FIGS. 6A and 6B illustrate the response of DC-DC converters with and without the variable compensation loop calculation rate disclosed herein. In FIG. 6A, the DC-DC converter DC-DC converter 100, which includes variable compensation loop calculation rate, transitions from burst-off state to burst-on state responsive to an increase in load in about 12 µs with about 380 mV of undershoot. In FIG. 6B, a DC-DC converter that lacks variable compensation loop calculation rate transitions from burst-off state to burst-on state responsive to the same increase in load in about 33.6 µs with about 600 mV of undershoot. Thus, implementation of the variable loop compensation rate described herein decreases response time and undershoot relative to DC-DC converters that lack variable loop compensation rate.

In this description, the term "couple" or "couples" may cover connections, communications, or signal paths that enable a functional relationship consistent with this description. For example, if device A generates a signal to control device B to perform an action: (a) in a first example, device A is coupled to device B; or (b) in a second example, device A is coupled to device B through intervening component C if intervening component C does not substantially alter the functional relationship between device A and device B, such that device B is controlled by device A via the control signal generated by device A. Also, in this description, the recitation "based on" means "based at least in part on." Therefore, if X is based on Y, then X may be a function of Y and any number of other factors.

Modifications are possible in the described embodiments, and other embodiments are possible, within the scope of the claims.

What is claimed is:

1. A DC-DC converter, comprising:
   a ramp generator configured to generate a voltage ramp;
   a threshold voltage circuit configured to generate a threshold voltage;
   a control circuit coupled to the ramp generator and the threshold voltage circuit, and including:
   a digital pulse width modulator (DPWM) circuit configured to generate a power stage switch control signal responsive to a loop compensation value, and to generate a compensation trigger signal responsive to the voltage ramp exceeding the threshold voltage, wherein the DPWM circuit includes a blanking timer configured to set a minimum period for the compensation trigger signal; and
   a loop compensation circuit coupled to the DPWM circuit, and configured to:
   calculate the loop compensation value responsive to the voltage ramp exceeding the threshold voltage; and
   generate the loop compensation value responsive to activation of the compensation trigger signal
   wherein the DC-DC converter is configured to:
   operate in a burst-off state to power a first load;
   operate in a burst-on state to power a second load that is heavier than the first load; and
   a period for calculation of the loop compensation value is shorter when operating in the burst-off state than when operating in the burst-on state.

2. The DC-DC converter of claim 1, wherein the control circuit includes an analog comparator coupled to the ramp generator and the threshold voltage circuit, and configured to compare the voltage ramp to the threshold voltage.

3. The DC-DC converter of claim 1, wherein the loop compensation circuit includes a proportional integral controller.

4. The DC-DC converter of claim 1, wherein the DPWM circuit is configured to:
   generate a ramp control signal to control generation of the voltage ramp by the ramp generator; and
   set the ramp control signal to maintain the voltage ramp at a voltage greater than the threshold voltage while operating in the burst-off state.

5. The DC-DC converter of claim 1, wherein the control circuit is configured to:
   set the period of calculation of the loop compensation value to be a period of the blanking timer based on the DC-DC converter operating in the burst-off state; and
   set the period of calculation of the loop compensation value to be a period of switching of a power stage based on the DC-DC converter operating in the burst-on state.

6. A method for controlling loop compensation in a DC-DC converter, the method comprising:
   generating a voltage ramp;
   generating a threshold voltage;
   comparing the voltage ramp to the threshold voltage;
   calculating, by a loop compensation circuit, a loop compensation value responsive to the voltage ramp exceeding the threshold voltage;
   generating, by a digital pulse width modulator (DPWM) circuit, a switch control signal based on the loop compensation value;
   applying the switch control signal to control a power stage;
   operating in a burst-off state responsive to a first load current;
   operating in a burst-on state responsive to a second load current that is greater than the first load current; and
   calculating the loop compensation value more frequently when operating in the burst-off state than when operating in the burst-on state.

7. The method of claim 6, further comprising:
   generating, by the DPWM circuit, a compensation trigger signal responsive to the voltage ramp exceeding the threshold voltage;

generating, by the DPWM circuit, a blanking signal that defines a minimum period for the compensation trigger signal; and
generating, by the loop compensation circuit, the loop compensation value responsive to activation of the compensation trigger signal.

8. The method of claim 7, further comprising:
setting a period of the compensation trigger signal to be a period of the blanking signal when operating the DC-DC converter in the burst-off state; and
setting the period of the compensation trigger signal to be a period of the switch control signal based on the DC-DC converter operating in the burst-on state.

9. The method of claim 6, further comprising:
generating, by the DPWM circuit, a ramp control signal to control generation of the voltage ramp; and
setting the ramp control signal to maintain the voltage ramp at a voltage greater than the threshold voltage while operating in the burst-off state.

10. The method of claim 6, wherein the loop compensation circuit includes a proportional integral controller.

11. The method of claim 6, further comprising comparing the voltage ramp to the threshold voltage using a comparator.

12. A DC-DC converter, comprising:
a ramp generator having a ramp input and a ramp output;
a threshold voltage circuit having a threshold output;
a control circuit including:
  a comparator having first and second comparator inputs and a comparator output, wherein the first comparator input is coupled to the ramp output, and the second comparator input is coupled to the threshold output;
  a digital pulse width modulator (DPWM) circuit having:
    a ramp control output coupled to the ramp input;
    a compensation trigger circuit coupled to the comparator output, and having a compensation trigger output; and
    a loop compensation input;
  a loop compensation circuit having a compensation circuit input and a compensation output, wherein the compensation circuit input is coupled to the compensation trigger output, and the compensation output is coupled to the loop compensation input; and
wherein the DC-DC converter is configured to:
  operate in a burst-off state to power a first load;
  operate in a burst-on state to power a second load that is heavier than the first load; and
  calculate a loop compensation value more frequently when operating in the burst-off state than when operating in the burst-on state.

13. The DC-DC converter of claim 12, wherein:
the compensation trigger circuit is configured to provide a compensation trigger signal; and
the loop compensation circuit is configured to generate the loop compensation value responsive to the compensation trigger signal.

14. The DC-DC converter of claim 13, wherein the compensation trigger circuit includes a blanking timer.

15. The DC-DC converter of claim 14, wherein the blanking timer is configured to set a minimum period of the compensation trigger signal.

16. The DC-DC converter of claim 13, wherein:
the ramp generator is configured to provide a voltage ramp;
the threshold voltage circuit is configured to provide a threshold voltage;
the comparator is configured to compare the voltage ramp to the threshold voltage; and
the DPWM circuit is configured to set the ramp voltage to maintain a voltage greater than the threshold voltage while the DC-DC converter is operating in the burst-off state.

17. The DC-DC converter of claim 16, wherein the loop compensation circuit is configured to provide the compensation trigger signal responsive to the voltage ramp exceeding the threshold voltage.

* * * * *